(12) United States Patent
Reuven et al.

(10) Patent No.: US 9,496,900 B2
(45) Date of Patent: Nov. 15, 2016

(54) SIGNAL ACQUISITION IN A MULTIMODE ENVIRONMENT

(71) Applicant: MagnaCom Ltd., Petach Tikva (IL)

(72) Inventors: Ilan Reuven, Ganey Tikva (IL); Amir Eliaz, Moshav Ben Shemen (IL)

(73) Assignee: MagnaCom Ltd., Petach Tikva (IL)

( * ) Notice: Subject to any disclaimer, the term of this patent is extended or adjusted under 35 U.S.C. 154(b) by 0 days.

(21) Appl. No.: 14/704,260

(22) Filed: May 5, 2015

(65) Prior Publication Data

US 2015/0326271 A1 Nov. 12, 2015

Related U.S. Application Data

(60) Provisional application No. 61/989,122, filed on May 6, 2014.

(51) Int. Cl.
*H04B 1/04* (2006.01)
*H04L 1/00* (2006.01)

(52) U.S. Cl.
CPC .............. *H04B 1/04* (2013.01); *H04B 1/0475* (2013.01); *H04L 1/00* (2013.01); *H04L 1/0005* (2013.01); *H04B 2001/0425* (2013.01)

(58) Field of Classification Search
CPC .................. H04B 1/0475; H04B 1/62; H04B 2001/0425; H04L 1/001; H04L 1/0042; H04L 1/0072; H04L 25/03254
USPC ............................................ 455/114.2–114.3
See application file for complete search history.

(56) References Cited

U.S. PATENT DOCUMENTS

| 4,109,101 A | 8/1978 | Mitani |
| 4,135,057 A | 1/1979 | Bayless, Sr. et al. |
| 4,797,925 A | 1/1989 | Lin |
| 5,111,484 A | 5/1992 | Karabinis |

(Continued)

FOREIGN PATENT DOCUMENTS

| CN | 1710894 A | 12/2005 |
| CN | 101198160 A | 6/2008 |

(Continued)

OTHER PUBLICATIONS

Supplementary European Search Report for EP 13823230 dated Nov. 26, 2015.

(Continued)

*Primary Examiner* — Simon Nguyen
(74) *Attorney, Agent, or Firm* — Oblon, McClelland, Maier & Neustadt, L.L.P.

(57) ABSTRACT

A transmitter comprises a symbol mapper operable to map a frame of bits to a frame of symbols, where the symbols correspond to a determined modulation scheme, and circuitry operable to convert the frame of symbols to a physical layer signal and transmit the physical layer signal onto a communication medium. The circuitry is operable to process the physical layer signal such that a first portion of the physical layer signal is a first type of signal (e.g., a linear signal and/or non-ISC signal) and a second portion of the physical layer signal is a second type of signal (e.g., non-linear signal and/or ISC signal). The first portion of the physical layer signal may comprise a header, a preamble, and/or a payload of the frame. The second portion of the physical layer signal may comprise a header, a preamble, and/or a payload of the frame.

20 Claims, 11 Drawing Sheets

(56) References Cited

U.S. PATENT DOCUMENTS

| | | |
|---|---|---|
| 5,131,011 A | 7/1992 | Bergmans et al. |
| 5,202,903 A | 4/1993 | Okanoue |
| 5,249,200 A | 9/1993 | Chen et al. |
| 5,283,813 A | 2/1994 | Shalvi et al. |
| 5,291,516 A | 3/1994 | Dixon et al. |
| 5,394,439 A | 2/1995 | Hemmati |
| 5,432,822 A | 7/1995 | Kaewell, Jr. |
| 5,459,762 A | 10/1995 | Wang et al. |
| 5,590,121 A | 12/1996 | Geigel et al. |
| 5,602,507 A | 2/1997 | Suzuki |
| 5,710,792 A | 1/1998 | Fukawa et al. |
| 5,757,855 A | 5/1998 | Strolle et al. |
| 5,784,415 A | 7/1998 | Chevillat et al. |
| 5,818,653 A | 10/1998 | Park et al. |
| 5,886,748 A | 3/1999 | Lee |
| 5,889,823 A | 3/1999 | Agazzi et al. |
| 5,915,213 A | 6/1999 | Iwatsuki et al. |
| 5,930,309 A | 7/1999 | Knutson et al. |
| 5,946,359 A | 8/1999 | Tajiri et al. |
| 6,009,120 A | 12/1999 | Nobakht |
| 6,167,079 A | 12/2000 | Kinnunen et al. |
| 6,233,709 B1 | 5/2001 | Zhang et al. |
| 6,272,173 B1 | 8/2001 | Hatamian |
| 6,335,954 B1 | 1/2002 | Bottomley et al. |
| 6,356,586 B1 | 3/2002 | Krishnamoorthy et al. |
| 6,516,025 B1 | 2/2003 | Warke et al. |
| 6,516,437 B1 | 2/2003 | Van Stralen et al. |
| 6,529,303 B1 | 3/2003 | Rowan et al. |
| 6,532,256 B2 | 3/2003 | Miller |
| 6,535,549 B1 | 3/2003 | Scott et al. |
| 6,591,090 B1 | 7/2003 | Vuorio et al. |
| 6,608,873 B1 | 8/2003 | Spinnler et al. |
| 6,675,184 B1 | 1/2004 | Matsui |
| 6,690,754 B1 | 2/2004 | Haratsch et al. |
| 6,697,441 B1 | 2/2004 | Bottomley et al. |
| 6,718,165 B1 | 4/2004 | Ha |
| 6,785,342 B1 | 8/2004 | Isaksen et al. |
| 6,871,208 B1 | 3/2005 | Guo et al. |
| 6,968,021 B1 | 11/2005 | White et al. |
| 6,985,709 B2 | 1/2006 | Perets |
| 7,158,324 B2 | 1/2007 | Stein et al. |
| 7,190,288 B2 | 3/2007 | Robinson et al. |
| 7,190,721 B2 | 3/2007 | Garrett |
| 7,205,798 B1 | 4/2007 | Agarwal et al. |
| 7,206,363 B2 | 4/2007 | Hegde et al. |
| 7,215,716 B1 | 5/2007 | Smith |
| 7,269,205 B2 | 9/2007 | Wang |
| 7,286,598 B2 | 10/2007 | Kochale et al. |
| 7,318,185 B2 | 1/2008 | Khandani et al. |
| 7,333,561 B2 | 2/2008 | Pinckley et al. |
| 7,336,716 B2 | 2/2008 | Maltsev et al. |
| 7,463,697 B2 | 12/2008 | Maltsev et al. |
| 7,467,338 B2 | 12/2008 | Saul |
| 7,577,085 B1 * | 8/2009 | Narasimhan ........ H04L 1/0606 370/206 |
| 7,583,755 B2 | 9/2009 | Ma et al. |
| 7,830,854 B1 | 11/2010 | Sarkar et al. |
| 7,924,956 B2 | 4/2011 | Maltsev et al. |
| 7,974,230 B1 | 7/2011 | Talley et al. |
| 8,005,170 B2 | 8/2011 | Lee et al. |
| 8,059,737 B2 | 11/2011 | Yang |
| 8,175,186 B1 | 5/2012 | Wiss et al. |
| 8,175,201 B2 | 5/2012 | Mathew et al. |
| 8,199,804 B1 | 6/2012 | Cheong |
| 8,248,975 B2 | 8/2012 | Fujita et al. |
| 8,265,561 B2 | 9/2012 | Nakamura |
| 8,326,238 B2 | 12/2012 | Yang et al. |
| 8,331,500 B2 | 12/2012 | Choi et al. |
| 8,351,536 B2 | 1/2013 | Mazet et al. |
| 8,422,589 B2 | 4/2013 | Golitschek Elder Von Elbwart et al. |
| 8,427,935 B2 | 4/2013 | Van de Beek et al. |
| 8,432,987 B2 | 4/2013 | Siti et al. |
| 8,498,591 B1 | 7/2013 | Qian et al. |
| 8,519,789 B2 | 8/2013 | Hawkes |
| 8,526,523 B1 | 9/2013 | Eliaz |
| 8,548,072 B1 | 10/2013 | Eliaz |
| 8,548,089 B2 | 10/2013 | Agazzi et al. |
| 8,548,097 B1 | 10/2013 | Eliaz |
| 8,553,821 B1 | 10/2013 | Eliaz |
| 8,559,494 B1 | 10/2013 | Eliaz |
| 8,559,496 B1 | 10/2013 | Eliaz |
| 8,559,498 B1 | 10/2013 | Eliaz |
| 8,565,363 B1 | 10/2013 | Eliaz |
| 8,566,687 B1 | 10/2013 | Eliaz |
| 8,571,131 B1 | 10/2013 | Eliaz |
| 8,571,146 B1 | 10/2013 | Eliaz |
| 8,572,458 B1 | 10/2013 | Eliaz |
| 8,582,637 B1 | 11/2013 | Eliaz |
| 8,599,914 B1 | 12/2013 | Eliaz |
| 8,605,832 B1 | 12/2013 | Eliaz |
| 8,665,941 B1 | 3/2014 | Eliaz |
| 8,665,992 B1 | 3/2014 | Eliaz |
| 8,666,000 B2 | 3/2014 | Eliaz |
| 8,675,769 B1 | 3/2014 | Eliaz |
| 8,675,782 B2 | 3/2014 | Eliaz |
| 8,681,889 B2 | 3/2014 | Eliaz |
| 8,731,413 B1 | 5/2014 | Dave et al. |
| 8,737,458 B2 | 5/2014 | Eliaz |
| 8,744,003 B2 | 6/2014 | Eliaz |
| 8,744,009 B2 | 6/2014 | Kleider et al. |
| 8,774,733 B2 * | 7/2014 | Shao ................ H04W 52/0225 370/318 |
| 8,774,738 B2 | 7/2014 | Dakshinamurthy et al. |
| 8,781,008 B2 | 7/2014 | Eliaz |
| 8,804,879 B1 | 8/2014 | Eliaz |
| 8,811,548 B2 | 8/2014 | Eliaz |
| 8,824,572 B2 | 9/2014 | Eliaz |
| 8,824,599 B1 | 9/2014 | Eliaz |
| 8,824,611 B2 | 9/2014 | Eliaz |
| 8,831,124 B2 | 9/2014 | Eliaz |
| 8,842,778 B2 | 9/2014 | Eliaz |
| 8,873,612 B1 | 10/2014 | Eliaz |
| 8,885,698 B2 | 11/2014 | Eliaz |
| 8,885,786 B2 | 11/2014 | Eliaz |
| 8,891,701 B1 | 11/2014 | Eliaz |
| 8,897,387 B1 | 11/2014 | Eliaz |
| 8,897,405 B2 | 11/2014 | Eliaz |
| 8,948,321 B2 | 2/2015 | Eliaz |
| 8,972,836 B2 | 3/2015 | Eliaz |
| 8,976,853 B2 | 3/2015 | Eliaz |
| 8,976,911 B2 | 3/2015 | Eliaz |
| 8,982,984 B2 | 3/2015 | Eliaz |
| 8,989,249 B2 | 3/2015 | Zerbe et al. |
| 9,003,258 B2 | 4/2015 | Eliaz |
| 9,071,305 B2 | 6/2015 | Eliaz |
| 9,088,400 B2 | 7/2015 | Eliaz |
| 9,088,469 B2 | 7/2015 | Eliaz |
| 9,094,269 B2 | 7/2015 | Ling et al. |
| 9,100,071 B2 | 8/2015 | Eliaz |
| 9,106,292 B2 | 8/2015 | Eliaz |
| 9,118,519 B2 | 8/2015 | Eliaz et al. |
| 9,124,399 B2 | 9/2015 | Eliaz et al. |
| 9,130,627 B2 | 9/2015 | Eliaz |
| 9,130,637 B2 | 9/2015 | Eliaz |
| 9,130,795 B2 | 9/2015 | Eliaz |
| 9,137,057 B2 | 9/2015 | Eliaz |
| 9,166,833 B2 | 10/2015 | Eliaz |
| 9,166,834 B2 | 10/2015 | Eliaz |
| 9,191,247 B1 | 11/2015 | Stopler |
| 9,209,843 B2 | 12/2015 | Eliaz |
| 9,215,102 B2 | 12/2015 | Eliaz et al. |
| 9,219,632 B2 | 12/2015 | Eliaz et al. |
| 9,231,628 B2 | 1/2016 | Eliaz |
| 9,246,523 B1 | 1/2016 | Stopler et al. |
| 2001/0008542 A1 | 7/2001 | Wiebke et al. |
| 2001/0036151 A1 | 11/2001 | Cimini |
| 2002/0016938 A1 | 2/2002 | Starr |
| 2002/0060827 A1 | 5/2002 | Agazzi |
| 2002/0123318 A1 | 9/2002 | Lagarrigue |
| 2002/0150065 A1 | 10/2002 | Ponnekanti |
| 2002/0150184 A1 | 10/2002 | Hafeez et al. |
| 2002/0172297 A1 | 11/2002 | Ouchi et al. |
| 2003/0016741 A1 | 1/2003 | Sasson et al. |

(56) References Cited

U.S. PATENT DOCUMENTS

| | | |
|---|---|---|
| 2003/0132814 A1 | 7/2003 | Nyberg |
| 2003/0135809 A1 | 7/2003 | Kim |
| 2003/0207680 A1 | 11/2003 | Yang et al. |
| 2003/0210352 A1 | 11/2003 | Fitzsimmons et al. |
| 2003/0227981 A1 | 12/2003 | Vella-Coleiro |
| 2004/0008616 A1 | 1/2004 | Jung |
| 2004/0009783 A1 | 1/2004 | Miyoshi |
| 2004/0037374 A1 | 2/2004 | Gonikberg |
| 2004/0081259 A1 | 4/2004 | Ammer et al. |
| 2004/0086276 A1 | 5/2004 | Lenosky |
| 2004/0120409 A1 | 6/2004 | Yasotharan et al. |
| 2004/0142666 A1 | 7/2004 | Creigh et al. |
| 2004/0170228 A1 | 9/2004 | Vadde |
| 2004/0174937 A1 | 9/2004 | Ungerboeck |
| 2004/0203458 A1 | 10/2004 | Nigra |
| 2004/0227570 A1 | 11/2004 | Jackson et al. |
| 2004/0240578 A1 | 12/2004 | Thesling |
| 2004/0257955 A1 | 12/2004 | Yamanaka |
| 2005/0032472 A1 | 2/2005 | Jiang et al. |
| 2005/0047517 A1 | 3/2005 | Georgios et al. |
| 2005/0089125 A1 | 4/2005 | Zhidkov |
| 2005/0123077 A1 | 6/2005 | Kim |
| 2005/0135472 A1 | 6/2005 | Higashino |
| 2005/0136933 A1* | 6/2005 | Sandhu ............... H04L 1/0075 455/450 |
| 2005/0163252 A1 | 7/2005 | McCallister et al. |
| 2005/0165950 A1* | 7/2005 | Takagi ............... H04L 12/413 709/236 |
| 2005/0193318 A1 | 9/2005 | Okumura et al. |
| 2005/0219089 A1 | 10/2005 | Batruni |
| 2005/0220218 A1 | 10/2005 | Jensen et al. |
| 2005/0265470 A1 | 12/2005 | Kishigami et al. |
| 2005/0276317 A1 | 12/2005 | Jeong et al. |
| 2006/0034378 A1 | 2/2006 | Lindskog et al. |
| 2006/0067396 A1 | 3/2006 | Christensen |
| 2006/0109780 A1 | 5/2006 | Fechtel |
| 2006/0109935 A1 | 5/2006 | McQueen et al. |
| 2006/0171489 A1 | 8/2006 | Ghosh et al. |
| 2006/0176948 A1 | 8/2006 | Lee |
| 2006/0203943 A1 | 9/2006 | Scheim et al. |
| 2006/0239339 A1 | 10/2006 | Brown et al. |
| 2006/0245346 A1 | 11/2006 | Bar-Ness et al. |
| 2006/0245765 A1 | 11/2006 | Elahmadi et al. |
| 2006/0280113 A1 | 12/2006 | Huo |
| 2007/0047121 A1 | 3/2007 | Eleftheriou et al. |
| 2007/0092017 A1 | 4/2007 | Abedi |
| 2007/0098059 A1 | 5/2007 | Ives et al. |
| 2007/0098090 A1 | 5/2007 | Ma et al. |
| 2007/0098116 A1 | 5/2007 | Kim et al. |
| 2007/0110177 A1 | 5/2007 | Molander et al. |
| 2007/0110191 A1 | 5/2007 | Kim et al. |
| 2007/0127608 A1 | 6/2007 | Scheim et al. |
| 2007/0140330 A1 | 6/2007 | Allpress et al. |
| 2007/0153884 A1* | 7/2007 | Balasubramanian . H03F 1/3247 375/221 |
| 2007/0189404 A1 | 8/2007 | Baum et al. |
| 2007/0213087 A1 | 9/2007 | Laroia et al. |
| 2007/0230593 A1 | 10/2007 | Eliaz et al. |
| 2007/0258517 A1 | 11/2007 | Rollings et al. |
| 2007/0258533 A1 | 11/2007 | Tsai et al. |
| 2007/0291719 A1 | 12/2007 | Demirhan et al. |
| 2008/0002789 A1 | 1/2008 | Jao et al. |
| 2008/0049598 A1 | 2/2008 | Ma et al. |
| 2008/0080644 A1 | 4/2008 | Batruni |
| 2008/0130716 A1 | 6/2008 | Cho et al. |
| 2008/0130788 A1 | 6/2008 | Copeland |
| 2008/0144709 A1 | 6/2008 | McCallister et al. |
| 2008/0159377 A1 | 7/2008 | Allpress et al. |
| 2008/0207143 A1 | 8/2008 | Skarby et al. |
| 2008/0260985 A1 | 10/2008 | Shirai et al. |
| 2008/0266450 A1 | 10/2008 | Eliaz et al. |
| 2008/0267278 A1 | 10/2008 | Heiman et al. |
| 2008/0285640 A1* | 11/2008 | McCallister ...... H04L 25/03044 375/233 |
| 2009/0003425 A1 | 1/2009 | Shen et al. |
| 2009/0028234 A1 | 1/2009 | Zhu |
| 2009/0034625 A1 | 2/2009 | Komi |
| 2009/0052577 A1 | 2/2009 | Wang |
| 2009/0058521 A1 | 3/2009 | Fernandez |
| 2009/0075590 A1 | 3/2009 | Sahinoglu et al. |
| 2009/0086808 A1 | 4/2009 | Liu et al. |
| 2009/0115513 A1 | 5/2009 | Hongo et al. |
| 2009/0122854 A1 | 5/2009 | Zhu et al. |
| 2009/0135972 A1 | 5/2009 | Tanaka et al. |
| 2009/0137212 A1 | 5/2009 | Belotserkovsky |
| 2009/0144059 A1 | 6/2009 | Yu et al. |
| 2009/0185612 A1 | 7/2009 | McKown |
| 2009/0213907 A1 | 8/2009 | Bottomley |
| 2009/0213908 A1 | 8/2009 | Bottomley |
| 2009/0220034 A1 | 9/2009 | Ramprashad et al. |
| 2009/0222262 A1 | 9/2009 | Kim et al. |
| 2009/0245226 A1 | 10/2009 | Robinson et al. |
| 2009/0245401 A1 | 10/2009 | Chrabieh et al. |
| 2009/0286494 A1 | 11/2009 | Lee et al. |
| 2009/0290620 A1 | 11/2009 | Tzannes et al. |
| 2009/0323841 A1 | 12/2009 | Clerckx et al. |
| 2010/0002692 A1 | 1/2010 | Bims |
| 2010/0002792 A1* | 1/2010 | Seyedi-Esfahani ... H04L 5/0007 375/260 |
| 2010/0034253 A1 | 2/2010 | Cohen |
| 2010/0039100 A1 | 2/2010 | Sun et al. |
| 2010/0062705 A1 | 3/2010 | Rajkotia et al. |
| 2010/0074349 A1 | 3/2010 | Hyllander et al. |
| 2010/0080266 A1* | 4/2010 | Zhang ............... H04J 13/102 375/140 |
| 2010/0080312 A1 | 4/2010 | Moffatt et al. |
| 2010/0158085 A1 | 6/2010 | Khayrallah |
| 2010/0166050 A1 | 7/2010 | Aue |
| 2010/0172309 A1 | 7/2010 | Forenza et al. |
| 2010/0202505 A1 | 8/2010 | Yu et al. |
| 2010/0202507 A1 | 8/2010 | Allpress et al. |
| 2010/0203854 A1 | 8/2010 | Yu et al. |
| 2010/0208774 A1 | 8/2010 | Guess et al. |
| 2010/0208832 A1 | 8/2010 | Lee et al. |
| 2010/0215107 A1 | 8/2010 | Yang |
| 2010/0220825 A1 | 9/2010 | Dubuc et al. |
| 2010/0278288 A1 | 11/2010 | Panicker et al. |
| 2010/0283540 A1 | 11/2010 | Davies |
| 2010/0284481 A1 | 11/2010 | Murakami et al. |
| 2010/0309796 A1 | 12/2010 | Khayrallah |
| 2010/0329325 A1 | 12/2010 | Mobin et al. |
| 2011/0051864 A1 | 3/2011 | Chalia et al. |
| 2011/0064171 A1 | 3/2011 | Huang et al. |
| 2011/0069791 A1 | 3/2011 | He |
| 2011/0074500 A1 | 3/2011 | Bouillet et al. |
| 2011/0074506 A1 | 3/2011 | Kleider et al. |
| 2011/0075745 A1* | 3/2011 | Kleider ............. H04L 25/03057 375/260 |
| 2011/0090986 A1 | 4/2011 | Kwon et al. |
| 2011/0095819 A1 | 4/2011 | Velazquez |
| 2011/0101957 A1 | 5/2011 | Boufounos |
| 2011/0134899 A1 | 6/2011 | Jones, IV et al. |
| 2011/0150064 A1 | 6/2011 | Kim et al. |
| 2011/0164492 A1 | 7/2011 | Ma et al. |
| 2011/0170630 A1 | 7/2011 | Silverman et al. |
| 2011/0175678 A1 | 7/2011 | Velazquez |
| 2011/0182329 A1 | 7/2011 | Wehinger |
| 2011/0188550 A1 | 8/2011 | Wajcer et al. |
| 2011/0228869 A1 | 9/2011 | Barsoum et al. |
| 2011/0243266 A1 | 10/2011 | Roh |
| 2011/0249709 A1 | 10/2011 | Shiue et al. |
| 2011/0275338 A1 | 11/2011 | Seshadri et al. |
| 2011/0310823 A1 | 12/2011 | Nam et al. |
| 2011/0310978 A1 | 12/2011 | Wu et al. |
| 2012/0025909 A1 | 2/2012 | Jo et al. |
| 2012/0027132 A1 | 2/2012 | Rouquette |
| 2012/0051464 A1 | 3/2012 | Kamuf et al. |
| 2012/0057449 A1* | 3/2012 | Takaoka ............... H04B 1/713 370/210 |
| 2012/0076220 A1 | 3/2012 | Kimura et al. |
| 2012/0106617 A1 | 5/2012 | Jao et al. |
| 2012/0120990 A1 | 5/2012 | Koren et al. |
| 2012/0163489 A1 | 6/2012 | Ramakrishnan |
| 2012/0177138 A1 | 7/2012 | Chrabieh et al. |

(56) References Cited

U.S. PATENT DOCUMENTS

| | | |
|---|---|---|
| 2012/0207248 A1 | 8/2012 | Ahmed et al. |
| 2012/0269286 A1 | 10/2012 | Huang et al. |
| 2012/0294240 A1 | 11/2012 | Nakano et al. |
| 2013/0028299 A1 | 1/2013 | Tsai |
| 2013/0044877 A1 | 2/2013 | Liu et al. |
| 2013/0077563 A1 | 3/2013 | Kim et al. |
| 2013/0121257 A1 | 5/2013 | He et al. |
| 2013/0200950 A1 | 8/2013 | Bai |
| 2013/0343480 A1 | 12/2013 | Eliaz |
| 2013/0343487 A1 | 12/2013 | Eliaz |
| 2014/0036969 A1 | 2/2014 | Wyville et al. |
| 2014/0036986 A1 | 2/2014 | Eliaz |
| 2014/0056387 A1 | 2/2014 | Asahina |
| 2014/0098841 A2 | 4/2014 | Song et al. |
| 2014/0098907 A1 | 4/2014 | Eliaz |
| 2014/0098915 A1 | 4/2014 | Eliaz |
| 2014/0105267 A1 | 4/2014 | Eliaz |
| 2014/0105268 A1 | 4/2014 | Eliaz |
| 2014/0105332 A1 | 4/2014 | Eliaz |
| 2014/0105334 A1 | 4/2014 | Eliaz |
| 2014/0108892 A1 | 4/2014 | Eliaz |
| 2014/0133540 A1 | 5/2014 | Eliaz |
| 2014/0140388 A1 | 5/2014 | Eliaz |
| 2014/0140446 A1 | 5/2014 | Eliaz |
| 2014/0146911 A1 | 5/2014 | Eliaz |
| 2014/0161158 A1 | 6/2014 | Eliaz |
| 2014/0161170 A1 | 6/2014 | Eliaz |
| 2014/0198255 A1 | 7/2014 | Kegasawa |
| 2014/0226752 A1* | 8/2014 | Kim ............... H04L 1/0042 375/296 |
| 2014/0241477 A1 | 8/2014 | Eliaz |
| 2014/0247715 A1 | 9/2014 | Tsai |
| 2014/0247904 A1 | 9/2014 | Eliaz |
| 2014/0269861 A1 | 9/2014 | Eliaz |
| 2014/0286459 A1 | 9/2014 | Eliaz |
| 2014/0294119 A1 | 10/2014 | Sochacki |
| 2014/0301507 A1 | 10/2014 | Eliaz |
| 2014/0321525 A1 | 10/2014 | Eliaz |
| 2014/0328428 A1 | 11/2014 | Eliaz |
| 2014/0355718 A1 | 12/2014 | Guan et al. |
| 2014/0376358 A1 | 12/2014 | Eder et al. |
| 2015/0010108 A1 | 1/2015 | Eliaz |
| 2015/0049843 A1 | 2/2015 | Reuven et al. |
| 2015/0055722 A1 | 2/2015 | Eliaz |
| 2015/0063499 A1 | 3/2015 | Eliaz |
| 2015/0070089 A1 | 3/2015 | Eliaz |
| 2015/0071389 A1 | 3/2015 | Eliaz |
| 2015/0078491 A1 | 3/2015 | Eliaz |
| 2015/0124912 A1 | 5/2015 | Eliaz et al. |
| 2015/0131709 A1 | 5/2015 | Eliaz |
| 2015/0131710 A1 | 5/2015 | Eliaz |
| 2015/0131759 A1 | 5/2015 | Eliaz et al. |
| 2015/0146806 A1* | 5/2015 | Terry ............... H04L 25/0204 375/260 |
| 2015/0156041 A1 | 6/2015 | Eliaz |
| 2015/0172078 A1 | 6/2015 | Eliaz |
| 2015/0172079 A1 | 6/2015 | Eliaz |
| 2015/0207527 A1 | 7/2015 | Eliaz |
| 2015/0222456 A1 | 8/2015 | Intrater |
| 2015/0256293 A1 | 9/2015 | Eliaz |
| 2015/0270856 A1* | 9/2015 | Breynaert ............ H04L 27/3488 375/296 |
| 2015/0270926 A1 | 9/2015 | Eliaz |
| 2015/0311926 A1 | 10/2015 | Eliaz et al. |
| 2015/0312000 A1 | 10/2015 | Eliaz |
| 2015/0312065 A1 | 10/2015 | Eliaz |
| 2015/0358191 A1 | 12/2015 | Eliaz et al. |

FOREIGN PATENT DOCUMENTS

| | | |
|---|---|---|
| CN | 101562589 A | 10/2009 |
| CN | 101582748 A | 11/2009 |
| CN | 101790256 A | 7/2010 |
| EP | 1865677 A1 | 12/2007 |
| EP | 1928141 A2 | 4/2008 |
| EP | 1953981 A1 | 8/2008 |
| WO | 9941839 A1 | 8/1999 |
| WO | 2007/000495 A1 | 1/2007 |
| WO | 2008/154965 A1 | 12/2008 |
| WO | 2012/092647 A1 | 7/2012 |
| WO | 2013/030815 A1 | 3/2013 |

OTHER PUBLICATIONS

Supplementary European Search Report for EP 13807399 dated Nov. 20, 2015.

Adama A., et al., "Design of Low Intersymbol Interference Partial Response Data Transmission Filters", IEE Proceedings G. Electroic Circuits & Systems, Instit. of Elec. Eng. Stevenage, GB, vol. 133, No. 4, Aug. 1, 1986, pp. 195-202, XP000853659 ISSN: 0622-0039.

Int'l Search Report and Written Opinion for PCT/IB2015/01473 dated Dec. 10, 2015.

Equalization: The Correction and Analysis of Degraded Signals, White Paper, Agilent Technologies, Ransom Stephens V1.0, Aug. 15, 2005 (12 pages).

Modulation and Coding for Linear Gaussian Channels, G. David Forney, Jr., and Gottfried Ungerboeck, IEEE Transactions of Information Theory, vol. 44, No. 6, Oct. 1998 pp. 2384-2415 (32 pages).

Intuitive Guide to Principles of Communications, www.complextoreal.com, Inter Symbol Interference (ISI) and Root-raised Cosine (RRC) filtering, (2002), pp. 1-23 (23 pages).

Chan, N., "Partial Response Signaling with a Maximum Likelihood Sequence Estimation Receiver" (1980). Open Access Dissertations and Theses. Paper 2855, (123 pages).

The Viterbi Algorithm, Ryan, M.S. and Nudd, G.R., Department of Computer Science, Univ. of Warwick, Coventry, (1993) (17 pages).

R. A. Gibby and J. W. Smith, "Some extensions of Nyquist's telegraph transmission theory," Bell Syst. Tech. J., vol. 44, pp. 1487-1510, Sep. 1965.

J. E. Mazo and H. J. Landau, "On the minimum distance problem for faster-than-Nyquist signaling," IEEE Trans. Inform. Theory, vol. 34, pp. 1420-1427, Nov. 1988.

D. Hajela, "On computing the minimum distance for faster than Nyquist signaling," IEEE Trans. Inform. Theory, vol. 36, pp. 289-295, Mar. 1990.

G. Ungerboeck, "Adaptive maximum-likelihood receiver for carrier modulated data-transmission systems," IEEE Trans. Commun., vol. 22, No. 5, pp. 624-636, May 1974.

G.D. Forney, Jr., "Maximum-likelihood sequence estimation of digital sequences in the presence of intersymbol interference," IEEE Trans. Inform. Theory, vol. 18, No. 2, pp. 363-378, May 1972.

A. Duel-Hallen and C. Heegard, "Delayed decision-feedback sequence estimation," IEEE Trans. Commun., vol. 37, pp. 428-436, May 1989.

M. V. Eyubog •lu and S. U. Qureshi, "Reduced-state sequence estimation with set partitioning and decision feedback," IEEE Trans. Commun., vol. 36, pp. 13-20, Jan. 1988.

W. H. Gerstacker, F. Obernosterer, R. Meyer, and J. B. Huber, "An efficient method for prefilter computation for reduced-state equalization," Proc. of the 11th IEEE Int. Symp. Personal, Indoor and Mobile Radio Commun. PIMRC, vol. 1, pp. 604-609, London, UK, Sep. 18-21, 2000.

W. H. Gerstacker, F. Obernosterer, R. Meyer, and J. B. Huber, "On prefilter computation for reduced-state equalization," IEEE Trans. Wireless Commun., vol. 1, No. 4, pp. 793-800, Oct. 2002.

Joachim Hagenauer and Peter Hoeher, "A Viterbi algorithm with soft-decision outputs and its applications," in Proc. IEEE Global Telecommunications Conference 1989, Dallas, Texas, pp. 1680-1686,Nov. 1989.

S. Mita, M. Izumita, N. Doi, and Y. Eto, "Automatic equalizer for digital magnetic recording systems" IEEE Trans. Magn., vol. 25, pp. 3672-3674, 1987.

E. Biglieri, E. Chiaberto, G. P. Maccone, and E. Viterbo, "Compensation of nonlinearities in high-density magnetic recording channels," IEEE Trans. Magn., vol. 30, pp. 5079-5086, Nov. 1994.

W. E. Ryan and A. Gutierrez, "Performance of adaptive Volterra equalizers on nonlinear magnetic recording channels," IEEE Trans. Magn., vol. 31, pp. 3054-3056, Nov. 1995.

(56) References Cited

OTHER PUBLICATIONS

X. Che, "Nonlinearity measurements and write precompensation studies for a PRML recording channel," IEEE Trans. Magn., vol. 31, pp. 3021-3026, Nov. 1995.

O. E. Agazzi and N. Sheshadri, "On the use of tentative decisions to cancel intersymbol interference and nonlinear distortion (with application to magnetic recording channels)," IEEE Trans. Inform. Theory, vol. 43, pp. 394-408, Mar. 1997.

Miao, George J., Signal Processing for Digital Communications, 2006, Artech House, pp. 375-377.

Xiong, Fuqin. Digital Modulation Techniques, Artech House, 2006, Chapter 9, pp. 447-483.

Faulkner, Michael, "Low-Complex ICI Cancellation for Improving Doppler Performance in OFDM Systems", Center for Telecommunication and Microelectronics, 1-4244-0063-5/06/$2000 (c) 2006 IEEE. (5 pgs).

Stefano Tomasin, et al. "Iterative Interference Cancellation and Channel Estimation for Mobile OFDM", IEEE Transactions on Wireless Communications, vol. 4, No. 1, Jan. 2005, pp. 238-245.

Int'l Search Report and Written Opinion for PCT/IB2013/01866 dated Mar. 21, 2014.

Int'l Search Report and Written Opinion for PCT/IB2013/001923 dated Mar. 21, 2014.

Int'l Search Report and Written Opinion for PCT/IB2013/001878 dated Mar. 21, 2014.

Int'l Search Report and Written Opinion for PCT/IB2013/002383 dated Mar. 21, 2014.

Int'l Search Report and Written Opinion for PCT/IB2013/01860 dated Mar. 21, 2014.

Int'l Search Report and Written Opinion for PCT/IB2013/01970 dated Mar. 27, 2014.

Int'l Search Report and Written Opinion for PCT/IB2013/01930 dated May 15, 2014.

Int'l Search Report and Written Opinion for PCT/IB2013/02081 dated May 22, 2014.

Al-Dhahir, Naofal et al., "MMSE Decision-Feedback Equalizers: Finite-Length Results" IEEE Transactions on Information Theory, vol. 41, No. 4, Jul. 1995.

Cioffi, John M. et al., "MMSE Decision-Feedback Equalizers and Coding—Park I: Equalization Results" IEEE Transactions on Communications, vol. 43, No. 10, Oct. 1995.

Eyuboglu, M. Vedat et al., "Reduced-State Sequence Estimation with Set Partitioning and Decision Feedback" IEEE Transactions onCommunications, vol. 36, No. 1, Jan. 1988.

Khaled M. Gharaibeh, Nonlinear Distortion in Wireless Systems, 2011, John Wiley & Sons, 2nd Edition, chapter 3, pp. 59-81.

Forney, G. David Jr., "Coset Codes—Part I: Introduction and Geometrical Classification" IEEE Transactions on Information Theory, vol. 34, No. 5, Sep. 1988.

Int'l Search Report and Written Opinion for PCT/IB2014/002449 dated Mar. 12, 2015.

Digital predistortion of power amplifiers for wireless applications (Doctoral dissertation, Georgia Institute of Technology). Retrieved from the internet <http://http://202.28.199.34/multim/3126235.pdf> Ding, L Mar. 31, 2005.

Digital predistortion for power amplifiers using separable functions. Signal Processing, IEEE Transactions on, 58(8), 4121-4130. Retrieved from the internet </http://arxiv.org/ftp/arxiv/papers/1306/1306.0037.pdf> Jiang, H., & Wilford, P.A. Aug. 8, 2010.

Digital predistortion linearization methods for RF power amplifiers. Teknillinen korkeakoulu. Retrieved from the Internet <http://lib.tkk.fi/Diss/2008/isbn9789512295463/isbn9789512295463.pdf> Teikari I. Sep. 30, 2008.

Kayhan, F., et al., Joint Signal-Labeling Optimization for Pragmatic Capacity under Peak-Power Constraint, 978-1-4244-5637, 2010.

Kayhan, F., et al., Constellation Design for Transmission over Nonlinear Satellite Channels, Oct. 5, 2012.

Liu, N. et al., Iterative intersymbol interference cancellation in vestigial sideband Nyquist-subcarrier modulation system. Nov. 2014, Optical Engineering, vol. 53(11) 116109.

Singla, R., et al. Digital predistortion of power amplifiers using look-up table method with memory effects for LTE wireless systems, Journ. on Wireless Communications and Networking 2012:330 http:jwcn.eurasipjournals.com/content/2012/1/330.

Tellado, J., et al, PAR Reduction in Multicarrier Transmission Systems, Feb. 9, 1998.

Int'l Search Report and Written Opinion for PCT/IB2014/002688 dated Jun. 29, 2015.

Gregorio, F. H., et al. Receiver-side nonlinearities mitigation using an extended interative decision-based technique. Signal Processing, 91(8), 2042-2056, Mar. 23, 2011.

Int'l Search Report and Written Opinion for PCT/IB2015/00572 dated Oct. 10, 2015.

Chen, H., et al. An Iterative Method to Restore the Performance of Clipped and Filtered OFDM Signals, Dept. Elec. & Comp. Eng. 0-7803-7802-4/03/© 2003 IEEE, pp. 3438-3443.

Aziz, W., et al. PAPR Reduction in OFDM using Clipping and Filtering, World Applied Sciences Journal 18 (11): pp. 1495-1500, 2012 ISSN 1818-4952 © IDOSI Publications, 2012.

Abouty, S., et al. A Novel Iterative Clipping and Filtering Technique for PAPR Reduction of OFDM Signals: System Using DCT/IDCT Transform, Int'l Jour. of Future Generation Comm. and Networking, vol. 6, No. 1, Feb. 2013, pp. 1-8.

Gurung, A.K., et al., Power Savings Analysis of Clipping and Filtering Method in OFDM Systems, 978-1-4244-2603-4/08/© 2008 IEEE, pp. 204-208.

Wang, Y.-C., et al. Optimized Iterative Clipping and Filtering for PAPR Reduction of OFDM Signals, Jan. 13, 2011, pp. 1-9.

Lee, T., et al. Experimental Analysis of Clipping and Filtering Effects on OFDM Systems, 978-1-4244-6404-3/10/© 2010 IEEE, pp. 1-5.

da Silva, Pedro F.G., et al. Design of Crest Factor Reduction Techniques Based on Clipping and Filtering for Wireless Communications Systems, 978-1-4799-1132-5/13/ © 2013 IEEE, pp. 1-5.

Rana, M. M., Clipping Based PAPR Reduction Method for LTE OFDMA Systems, Int'l Journ. of Elec. & Comp. Sci. IJECS-IJENS vol. 10 No. 05 (Oct. 2010) pp. 1-5.

McClearnon, D., et al., Wideband Digital Pre-Distortion Modeling for LTE-Advanced, Agilent Technologies, Jul. 2012, p. 64.

* cited by examiner

FIG. 2
FIG. 3A
FIG. 3B

SIGNAL ACQUISITION IN A MULTIMODE ENVIRONMENT

PRIORITY CLAIM

This application claims priority to the following application(s), each of which is hereby incorporated herein by reference:
U.S. provisional patent application 61/989,122 titled "Signal Acquisition in a Multimode Environment" filed on May 6, 2014.

INCORPORATION BY REFERENCE

Each of the following applications is hereby incorporated herein by reference:
United States patent application publication 2014/0133540 titled "Low-Complexity, Highly-Spectrally-Efficient Communications;"
U.S. Pat. No. 8,831,124 titled "Multi-Mode Orthogonal Frequency Division Multiplexing Transmitter for Highly-Spectrally-Efficient Communications;"
U.S. Pat. No. 8,681,889 titled "Multi-Mode Orthogonal Frequency Division Multiplexing Receiver for Highly-Spectrally-Efficient Communications;"
United States patent application publication 2015/0070089 titled "Adaptive Nonlinear Model Learning;" and
U.S. patent application Ser. No. 14/600,310 titled "Communication Methods and Systems for Nonlinear Multi-User Environments."

BACKGROUND

Conventional communications systems suffer from degraded performance in the presence of nonlinear distortion. Further limitations and disadvantages of conventional and traditional approaches will become apparent to one of skill in the art, through comparison of such systems with some aspects of the present invention as set forth in the remainder of the present application with reference to the drawings.

BRIEF SUMMARY

System and methods are provided for signal acquisition in a multimode environment, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 2 depicts an example frame format for communications between devices which communicate using non-intersymbol-correlated signals in a multimode environment.

FIG. 3A depicts a first example frame format for communications between devices which communicate using intersymbol-correlated signals in a multimode environment.

FIG. 3B depicts a second example frame format for communications between devices which communicate using intersymbol-correlated signals in a multimode environment.

DETAILED DESCRIPTION

As used herein, a non-intersymbol-correlated (non-ISC) signal is a signal transmitted at a symbol rate that is less than twice the baseband bandwidth of the signal. Conversely, an intersymbol-correlated (ISC) signal is a signal transmitted at a symbol rate that is more than twice the baseband bandwidth of the signal. Another way of characterizing an ISC signal is that, even after: (1) sampling the signal at a sample rate at least two times its symbol rate; and (2) appropriately filtering it (e.g., a fixed root-raised-cosine (RRC) filter or equalizer configured such that an overall response of the transmitter and receiver is a raised cosine response), correlation of some or all of the resulting filtered samples is still above a threshold for two or more transmitted symbols of the signal. Attempts to recover the transmitted symbols through symbol-by-symbol slicing of the filtered samples of the ISC signal at fixed intervals will thus result in an expected error rate above a determined threshold.

As used herein, a nonlinear signal is a signal which is nonlinearly distorted to a significant degree such that the expected error rate in the receiver cannot be below a determined threshold unless the receiver compensates for the nonlinear distortion (e.g., through use of a nonlinear distortion compensation circuit that adaptively models the nonlinear distortion). A linear signal, on the other hand, is a signal for which the same receiver can achieve an expected error rate below the determined threshold even without compensating for the nonlinear distortion. The determined threshold for the expected error rate may correspond to a determined limit on nonlinear distortion which may be set by an applicable standard (e.g., promulgated by a regulatory body) and/or network operator. For example, the LTE standard specifies a maximum error vector magnitude (EVM) of 17.5% when using QPSK and 12.5% when using 16-QAM. Thus, in an example 16-QAM LTE implementation, a nonlinear signal is a signal having EVM greater than 12.5% and a linear signal is a signal having EVM of 12.5% or less.

Figure 1:
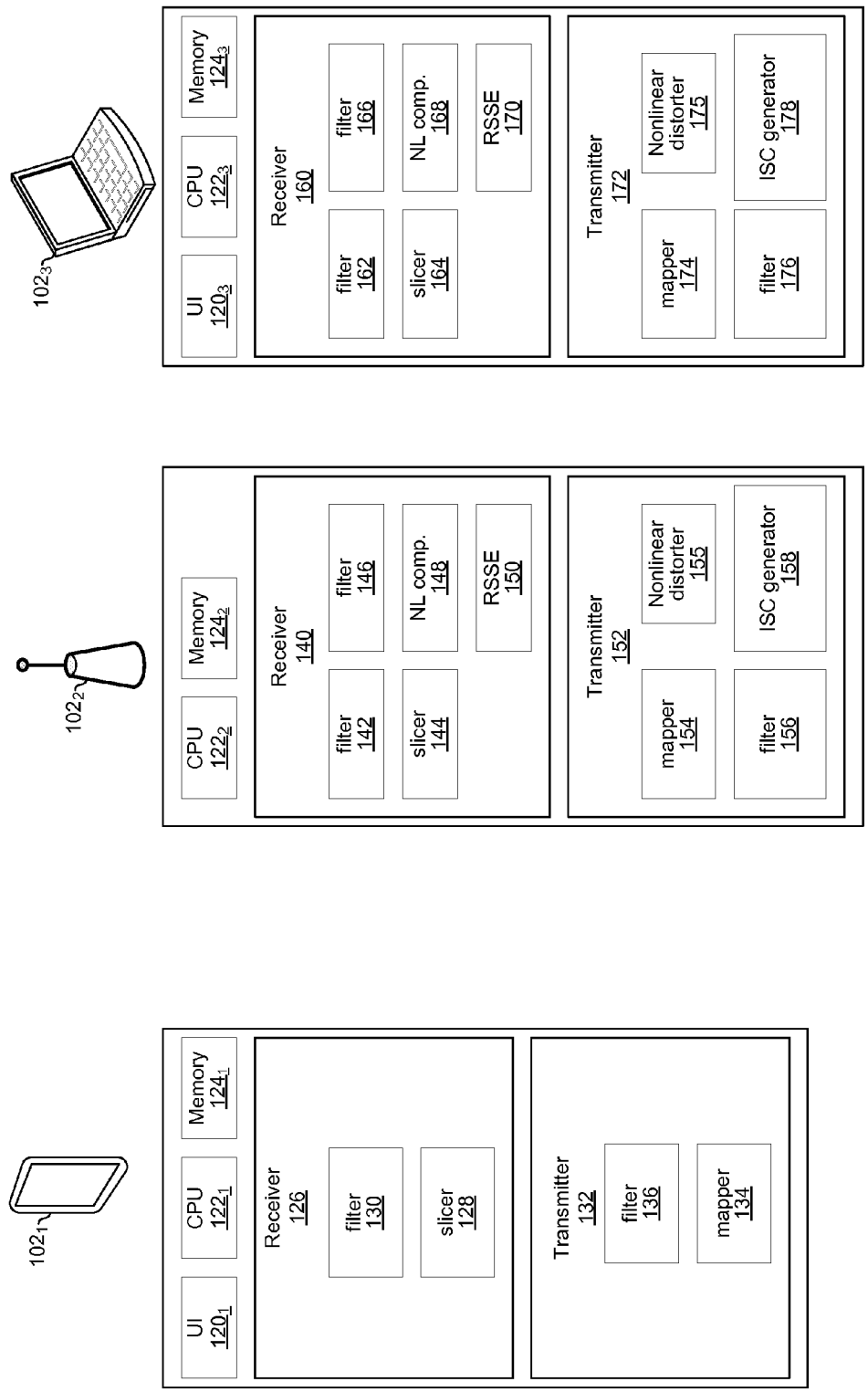
FIG. 1 is a diagram illustrating a communication network in which some devices communicate using non-intersymbol-correlated signals and some devices communicate using intersymbol-correlated signals.

FIG. 1 is a diagram illustrating a communication network in which some devices communicate using non-intersymbol-correlated (non-ISC) signals and some devices communicate using intersymbol-correlated (ISC) signals. Shown are two user equipment devices (UEs) $102_1$ and $102_3$ and an access point device $102_2$. Each of the UEs $102_1$ and $102_3$ may be, for example, a smartphone, a tablet computer, a laptop computer, a router, a network switch, a network gateway, or the like. The AP $102_2$ may be, for example, a cellular basestation, an 802.11 compatible access point, and/or the like. In some instances, the AP $102_2$ may be the same device as a UE device but configured into an access point mode.

The device $102_1$ comprises user interface circuitry 120 (e.g., touchscreen, buttons, speakers, etc. and their associated drivers), CPU 122, system memory 124 (e.g., flash, DRAM, SRAM, ROM, HDD, and/or the like), a receiver 126, and a transmitter 132. The receiver 126 comprises a filter 130 and a symbol slicer 128. The filter 130 may comprise, for example, a fixed-configuration filter or an equalizer that is configurable to achieve a desired response (e.g., a root-raised cosine (RRC) response, or other response such that the composite response of a transmitter and the filter 130 is a raised cosine response). The slicer 128 may be configured to sample a received signal at a fixed interval to generate pairs of in-phase and quadrature phase samples, and then determine the constellation point that is closest each such sample pair. The transmitter 132 comprises a filter 136 and a mapper 134. Each of the receiver 126 and transmitter 132 may communicate using single carrier and/or multi-carrier protocols. Where device $102_1$ is an LTE handset, for example, transmitter 132 may transmit in accordance with an SCFDMA scheme and receiver 126 may receive in accordance with an OFDM scheme.

The device $102_2$ comprises CPU $122_2$, system memory $124_2$, a receiver 140, and a transmitter 152. The receiver 140 comprises a filter 142 configured for processing non-ISC signals (e.g., configured to have an RRC response), a slicer 144, a filter 146 configured for processing intersymbol-correlated (ISC) signals, nonlinear distortion compensation circuit 148, and reduced state sequence estimation (RSSE) circuit 150. In an example implementation, the filter 142 and the filter 146 may be implemented with shared, reconfigurable circuitry. For example, an equalizer may be configurable into a first configuration which provides an RRC response and into a second configuration which provides a response such that the composite response of a transmitter and the filter 146 has desired inter-symbol correlation. In an example implementation, the ISC filter 146 (or the equalizer configured to have an ISC response) may be the same as the filter 109 in the above-incorporated U.S. patent application Ser. No. 14/074,878. The slicer 144 may be the same as slicer 128. In an example implementation, the RSSE circuit 130 may be the same as the sequence estimation circuit 210 of the above-incorporated United States Patent Application Publication 2014/0133540. In an example implementation, the RSSE circuit 130 may be part of the decoding circuit 218 of the above-incorporated U.S. Pat. No. 8,681,889. In an example implementation, the slicer 144 and the RSSE circuit 150 may be implemented with shared, reconfigurable circuitry. In an example implementation, the nonlinear distortion compensation circuit 148 may comprise one or more feedback loops and nonlinear distortion modeling circuitry operable to model/reproduce nonlinear distortion introduced by the transmitter, the communication medium, and/or the receiver front-end. The transmitter 152 comprises a symbol mapper 154, a filter 156, nonlinear distorter 158, and ISC generator 158. The nonlinear distorter 155 represents circuitry (e.g., a power amplifier and/or a predistortion circuit) that may introduce nonlinear distortion to signals transmitted by the transmitter 152. In an example implementation, the ISC generator 158 may be a filter (e.g., the filter 104 in the above-incorporated United States Patent Application Publication 2014/0133540) that introduces intersymbol correlation to the signal. In such an implementation, the ISC generator 158 and the filter 156 may be implemented with shared, reconfigurable circuitry. In another example implementation, the ISC generator 158 may introduce intersymbol correlation by predistorting the signal to be transmitted. In such an implementation, the ISC generator 158 may merge with the nonlinear distorter 155. Each of the receiver 126 and transmitter 132 may communicate using single carrier and/or multi-carrier protocols. Where device $102_2$ is an LTE basestation, for example, transmitter 152 may transmit in accordance with an OFDM scheme and receiver 140 may receive in accordance with an SCFDMA scheme.

The device $102_3$ comprises UI circuitry $120_3$, CPU $122_3$, system memory $124_3$, a receiver 160, and a transmitter 172. The receiver 160 comprises a filter 162 (the same as or similar to filter 142 described above), a filter 166 (the same as or similar to the filter 146 described above), nonlinear distortion compensation circuit 168 (the same as or similar to the nonlinear distortion compensation circuit 148 described above), slicer 164 (the same as or similar to slicer 144 described above), and RSSE circuit 170 (the same as or similar to the RSSE circuit 150 described above). The transmitter 172 comprises a mapper 174, a filter 176, nonlinear distorter 175, and ISC generator 178. The nonlinear distorter 155 represents circuitry (e.g., a power amplifier and/or a predistortion circuit) that may introduce nonlinear distortion to signals transmitted by the transmitter 172. In an example implementation, the ISC generator 178 may be a filter (e.g., the filter 104 in the above-incorporated United States Patent Application Publication 2014/0133540) that introduces intersymbol correlation to the signal. In such an implementation, the ISC generator 178 and the filter 176 may be implemented with shared, reconfigurable circuitry. In another example implementation, the ISC generator 178 may introduce intersymbol correlation by predistorting the signal to be transmitted. In such an implementation, the ISC generator 178 may merge with the nonlinear distorter 178. Each of the receiver 160 and transmitter 172 may communicate using single carrier and/or multi-carrier protocols. Where device $102_1$ is an LTE handset, for example, transmitter 172 may transmit in accordance with an SCFDMA scheme and receiver 160 may receive in accordance with an OFDM scheme.

FIG. 2 depicts an example frame format for communications among devices using non-intersymbol-correlated signals in a multimode environment. The frame 200 comprises a non-ISC preamble, a non-ISC header, and a non-ISC payload.

FIG. 3A depicts a first example frame format for communications among devices using ISC signals and non-ISC signals in a multimode environment. The frame 300 comprises a non-ISC preamble, a non-ISC header, and an ISC payload as compared to the non-ISC payload of frame 200.

FIG. 3B depicts a second example frame format for communications among devices using ISC signals and non-ISC in a multimode environment. The frame 320 comprises a non-ISC preamble and non-ISC header. A frame length field of the non-ISC header may indicate the length of ISC preamble plus the ISC payload. The frame 320 also comprises an ISC payload. In an example implementation, the ISC preamble may be formatted for use in initializing the state of RSSE circuitry (e.g., 150 or 170) and/or nonlinear distortion compensation circuitry (e.g., 148 and 168).

Figure 3C:
FIG. 3C depicts a third example frame format for communications between devices which communicate using intersymbol-correlated signals in a multimode environment.

FIG. 3C depicts a third example frame format for communications among devices using ISC signals and non-ISC signals in a multimode environment. The frame 340 comprises a non-ISC preamble, non-ISC header, ISC header, and ISC payload. In an example implementation, the frame length field of the non-ISC header of frame 340 may indicate the overall length of the ISC header plus ISC payload, and a frame length field of the ISC header may indicate the length of the ISC payload.

Figure 3D:
FIG. 3D depicts a fourth example frame format for communications between devices which communicate using intersymbol-correlated signals in a multimode environment.

FIG. 3D depicts a fourth example frame format for communications among devices using ISC signals and non-ISC signals in a multimode environment. The frame 360 comprises a non-ISC preamble, an ISC preamble, a non-ISC header, an ISC header, and an ISC payload. In an example implementation, the frame length field of the non-ISC header of frame 360 may indicate the overall length of the ISC preamble plus ISC header plus ISC payload, and the ISC header may indicate the length of the ISC payload.

Figure 4:
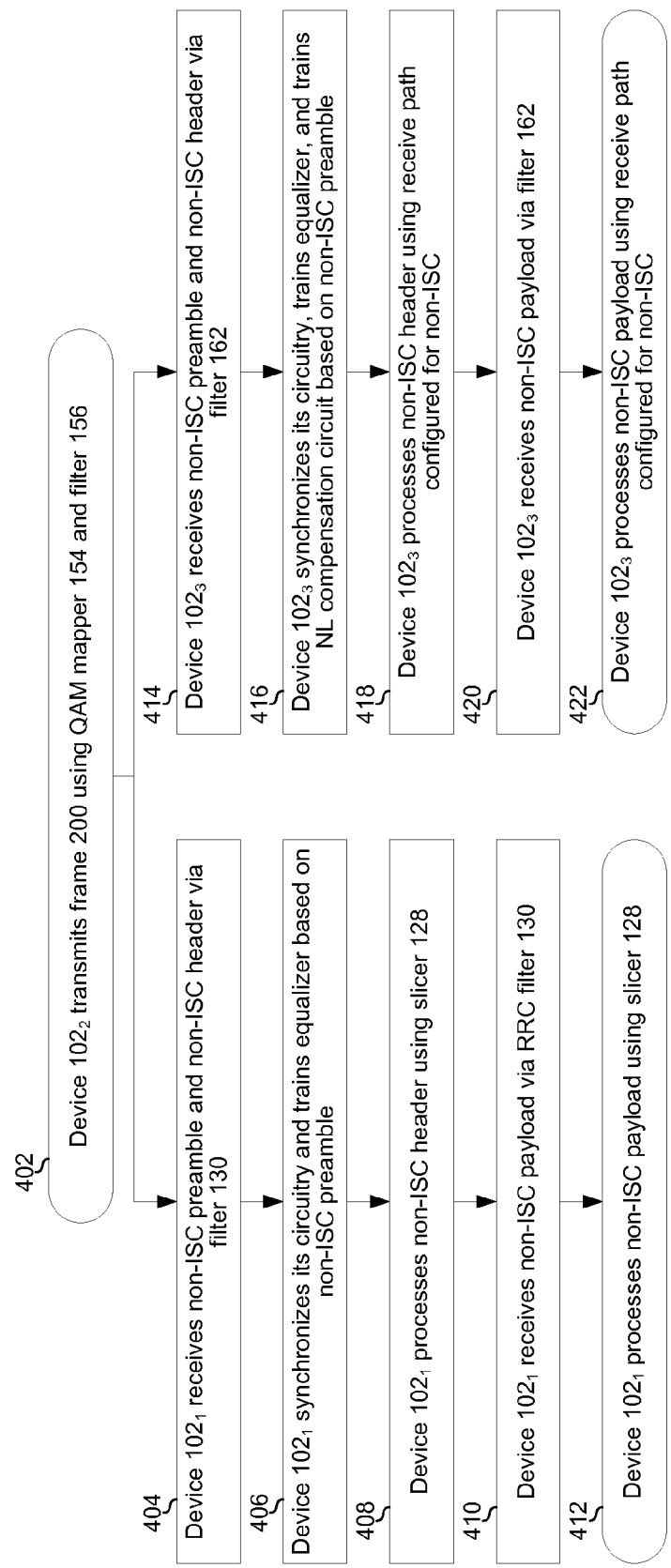
FIG. 4 depicts a flowchart for communication using the frame format of FIG. 2.

FIG. 4 depicts a flowchart for an example communication using the frame format of FIG. 2. The process begins with block 402. In block 402, the device $102_2$ transmits frame 200 using mapper 154 and filter 156.

In block 404, the device $102_1$ receives the non-ISC preamble and non-ISC header of frame 200 via filter 130. In block 406, the device $102_1$ synchronizes its circuitry and trains its equalizer (as necessary), using the non-ISC preamble of frame 200. In block 408, the device $102_1$ processes the non-ISC header using the slicer 128. In block 410, the device $102_1$ receives the non-ISC payload via filter 130. In block 412, the device $102_1$ processes non-ISC payload using slicer 128.

In block 414, the device $102_3$ receives the non-ISC preamble and the non-ISC header via filter 162. In block 416, the device $102_3$ synchronizes its circuitry, trains its equalizer (as necessary), and trains its nonlinear distortion compensation circuit 168 (e.g., determines a type of nonlinear model to use and/or parameters of a selected nonlinear model to use for processing the frame 200) using the non-ISC preamble. In block 418, the device $102_3$ processes the non-ISC header using a receive path configured for non-ISC signals. In an example implementation, such a receive path may comprise slicer 164. In another example implementation, such a receive path may comprise the RSSE circuit 170 configured into a mode in which it operates equivalently to slicer 164. Such a mode may, for example, be characterized by a memory depth of the sequence estimation being set to zero (e.g., it may be a parameter stored in a configuration register). In an example implementation, non-ISC preambles and/or headers may be demodulated without the aid of the nonlinear distortion compensation circuit 168 (e.g., it may be in a low power state), while in another example implementation the nonlinear distortion compensation circuit 168 may aid demodulation of non-ISC preambles and/or headers.

In block 420, the device $102_3$ receives the non-ISC payload via filter 162. In block 422, the device $102_3$ processes non-ISC payload using a receive path configured for non-ISC signals. In an example implementation, such a receive path may comprise slicer 164. In another example implementation, such a receive path may comprise the RSSE circuit 170 configured into a mode in which it operates equivalently to slicer 164. Such a mode may, for example, be characterized by a memory depth of the sequence estimation being set to zero (e.g., it may be a parameter stored in a configuration register). In an example implementation, non-ISC payloads may be demodulated without the aid of the nonlinear distortion compensation circuit 168 (e.g., it may be in a low power state), while in another example implementation the nonlinear distortion compensation circuit 168 may aid demodulation of non-ISC payloads.

Figure 5:
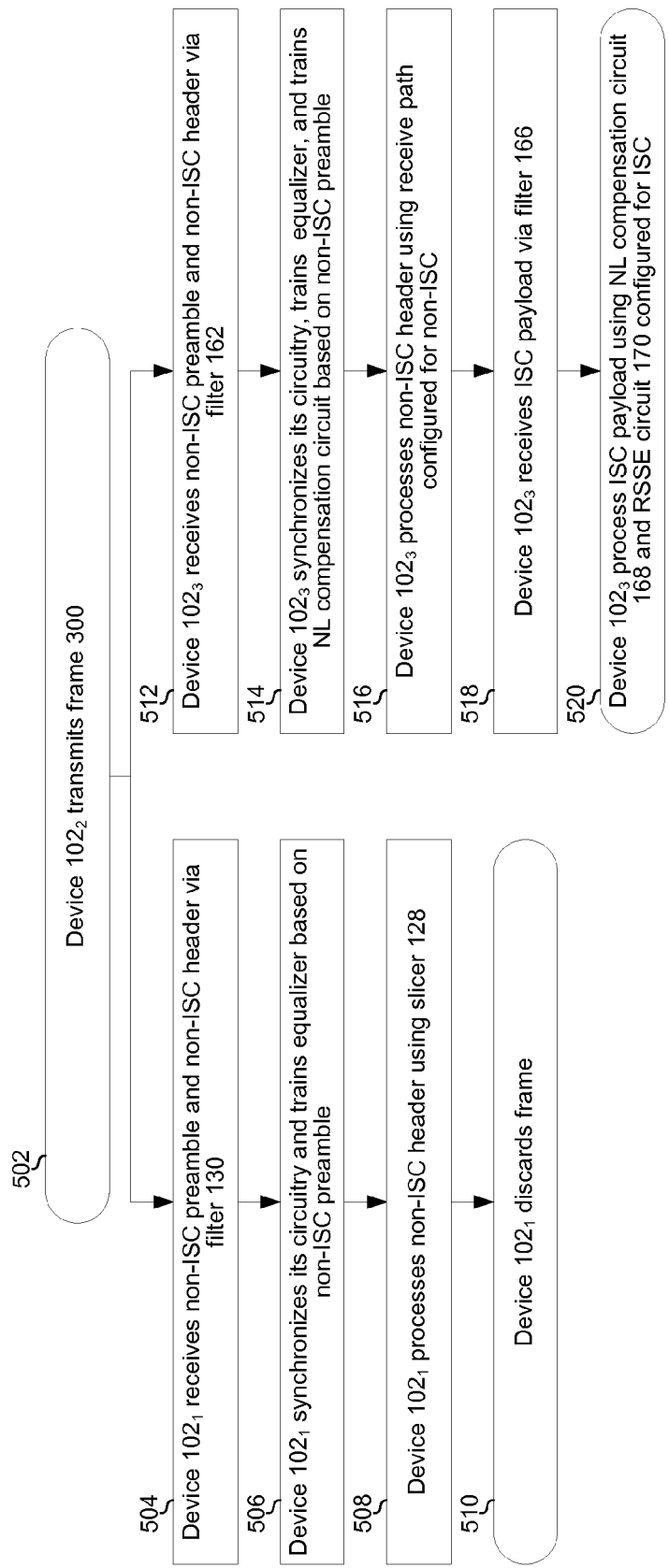
FIG. 5 depicts a flowchart for communication using the frame format of FIG. 3A.

FIG. 5 depicts a flowchart for an example communication using the frame format of FIG. 3A. The process begins with block 502. In block 502, the device $102_2$ transmits frame 300. In an example implementation, the non-ISC preamble and the non-ISC header are transmitted using mapper 154 and filter 156 configured to have an RRC response, while the ISC payload is transmitted using mapper 154 and ISC generator 158 configured to generate desired inter-symbol correlation. Thus, different portions of the frame 300 experience different signal paths through the transmitter 152. In another example implementation, each of the non-ISC preamble, non-ISC header, and ISC payload may be transmitted via the mapper 154, ISC generator 158, and filter 156, but with the ISC generator 158 and/or filter 156 being in a first configuration for the non-ISC preamble and non-ISC header and a second configuration for the ISC payload.

In block 504, the device $102_1$ receives the non-ISC preamble and non-ISC header via filter 130. In block 506, device $102_1$ synchronizes its circuitry and trains its equalizer (as necessary) using the non-ISC preamble. In block 508, the device $102_1$ processes the non-ISC header using slicer 128. In block 510, device $102_1$ either fails to detect the payload, or discards the payload after detecting, based on the header, that the payload will be an ISC signal, which the device $102_1$ is not configured to support. Where the device $102_1$ fails to detect the payload it may nonetheless retain synchronization with the device $102_2$ based on the frame length field detected in the non-ISC header.

In block 512, device $102_3$ receives the non-ISC preamble and the non-ISC header via filter 162. In block 514, device $102_3$ synchronizes its circuitry, trains its equalizer (as necessary), and trains its nonlinear distortion compensation circuit 168 using the non-ISC preamble. In block 516, the device $102_3$ processes the non-ISC header using a receive path configured for non-ISC signals. In an example implementation, such a receive path may comprise slicer 164. In another example implementation, such a receive path may comprise the RSSE circuit 170 configured into a mode in which it operates equivalently to slicer 164. Such a mode may, for example, be characterized by a memory depth of the sequence estimation being set to zero (e.g., it may be a parameter stored in a configuration register). In an example implementation, non-ISC payloads may be demodulated without the aid of the nonlinear distortion compensation circuit 168 (e.g., it may be in a low power state), while in another example implementation the nonlinear distortion compensation circuit 168 may aid demodulation of non-ISC payloads.

In block 518, the device 102₃ receives ISC payload via ISC filter 166. In block 520, device 102₃ process the ISC payload using nonlinear distortion compensation circuit 168 and RSSE circuit 170. Because the payload is ISC, the RSSE 170 may operate in a mode in which the payload is filtered by the filter 176 configured for ISC signals and/or demodulated by the RSSE circuit 170 configured into a mode in which it operable to account for intersymbol correlation better than can be done with a symbol-by-symbol slicing (for an ISC signal, the intersymbol correlation is unlikely to have minimums, let alone zeros, at regular intervals). Such a mode may be characterized by, for example, a memory depth of the sequence estimation being set to a non-zero value.

Figure 6:
FIG. 6 depicts a flowchart for communication using the frame format of FIG. 3B.

FIG. 6 depicts a flowchart for example communication using the frame format of FIG. 3B. The process begins with block 602. In block 602, the device 102₂ transmits frame 320. In an example implementation, the non-ISC preamble and the non-ISC header are transmitted using mapper 154 and filter 156 configured for non-ISC signals (e.g., configured to have an RRC response), while the ISC preamble and ISC payload are transmitted using mapper 154 and ISC generator 158. Thus, different portions of the frame 320 experience different signal paths through the transmitter 152. In another example implementation, each of the non-ISC preamble, non-ISC header, ISC preamble, and ISC payload may be transmitted via the mapper 154, ISC generator 158, and filter 156, but with the ISC generator 158 and/or filter 156 being in a first configuration for the non-ISC preamble and non-ISC header and a second configuration for the ISC preamble and ISC payload.

In block 604, the device 102₁ receives the non-ISC preamble and the non-ISC header via filter 130. In block 606, the device 102₁ synchronizes its circuitry and trains its equalizer (as necessary) based on the non-ISC preamble. In block 608, the device 102₁ processes the non-ISC header using slicer 128. In block 610, device 102₁ either fails to detect the payload or discards the payload after detecting, based on the header, that the payload will be transmitted as an ISC signal, which the device 102₁ is not configured to support. Where the device 102₁ fails to detect the payload it may nonetheless retain synchronization with the device 102₂ based on the frame length field detected in the non-ISC header.

In block 612, the device 102₃ receives the non-ISC preamble and the non-ISC header via filter 162 (e.g., configured to have an RRC response). In block 614, the device 102₃ synchronizes its circuitry and trains its equalizer (as necessary) based on the non-ISC preamble. In block 616, the device 102₃ processes the non-ISC header using a receive path configured for non-ISC signals. In an example implementation, such a receive path may comprise slicer 164. In another example implementation, such a receive path may comprise the RSSE circuit 170 configured into a mode in which it operates equivalently to slicer 164. Such a mode may, for example, be characterized by a memory depth of the sequence estimation being set to zero (e.g., it may be a parameter stored in a configuration register). In block 618, the device 102₃ receives the ISC preamble via filter 166. In block 620, the device 102₃ trains its nonlinear distortion compensation circuitry 168, and (optionally) initializes the state of the RSSE circuit 170 using the ISC preamble. In block 622, the device 102₃ process the ISC payload using the trained nonlinear distortion compensation circuit 168 and (initialized) RSSE circuit 170. Because the payload is ISC, the RSSE 170 may operate in a mode in which the payload is filtered with the filter 146 and/or demodulated by the RSSE circuit 170 configured into a mode in which it operable to account for intersymbol correlation better than can be done with a symbol-by-symbol slicing (for an ISC signal, the intersymbol correlation is unlikely to have minimums, let alone zeros, at well-defined intervals). Such a mode may be characterized by, for example, a memory depth of the sequence estimation being set to a non-zero value.

Figure 7:
FIG. 7 depicts an example frame format for communications between or among devices using linear signals in a multimode environment.

FIG. 7 depicts an example frame format for communications between or among devices using linear signals in a multimode environment. The frame 700 comprises a linear preamble, a linear header, and a linear payload.

Figure 8A:
FIG. 8A depicts a first example frame format for communications between or among devices using linear and nonlinear signals in a multimode environment.

FIG. 8A depicts a first example frame format for communications between or among devices using linear and nonlinear signals in a multimode environment. The frame 800 comprises a linear preamble, a linear header, and a nonlinear payload as compared to the linear payload of frame 200.

Figure 8B:
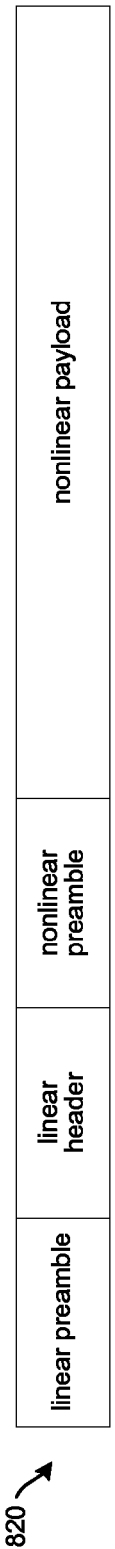
FIG. 8B depicts a second example frame format for communications between or among devices using linear and nonlinear signals in a multimode environment.

FIG. 8B depicts a second example frame format for communications between or among devices using linear and nonlinear signals in a multimode environment. The frame 820 comprises a linear preamble and linear header. A frame length field of the linear header may indicate the length of the nonlinear preamble plus the nonlinear payload. The frame 820 also comprises a nonlinear payload. In an example implementation, the nonlinear preamble may be formatted for use in initializing the state of RSSE circuitry (e.g., 150 or 170) and/or nonlinear distortion compensation circuitry (e.g., 148 and 168).

Figure 8C:
FIG. 8C depicts a third example frame format for communications between or among devices using linear and nonlinear signals in a multimode environment.

FIG. 8C depicts a third example frame format for communications between or among devices using linear and nonlinear signals in a multimode environment. The frame 840 comprises a linear preamble, linear header, nonlinear header, and nonlinear payload. In an example implementation, the frame length field of the linear header of frame 840 may indicate the overall length of the nonlinear header plus nonlinear payload, and a frame length field of the nonlinear header may indicate the length of the nonlinear payload.

Figure 8D:
FIG. 8D depicts a fourth example frame format for communications between or among devices using linear and nonlinear signals in a multimode environment.

FIG. 8D depicts a fourth example frame format for communications between or among devices using linear and nonlinear signals in a multimode environment. The frame 860 comprises a linear preamble, a nonlinear preamble, a linear header, a nonlinear header, and a nonlinear payload. In an example implementation, the frame length field of the linear header of frame 860 may indicate the overall length of the nonlinear preamble plus nonlinear header plus nonlinear payload, and the nonlinear header may indicate the length of the nonlinear payload.

Figure 9:
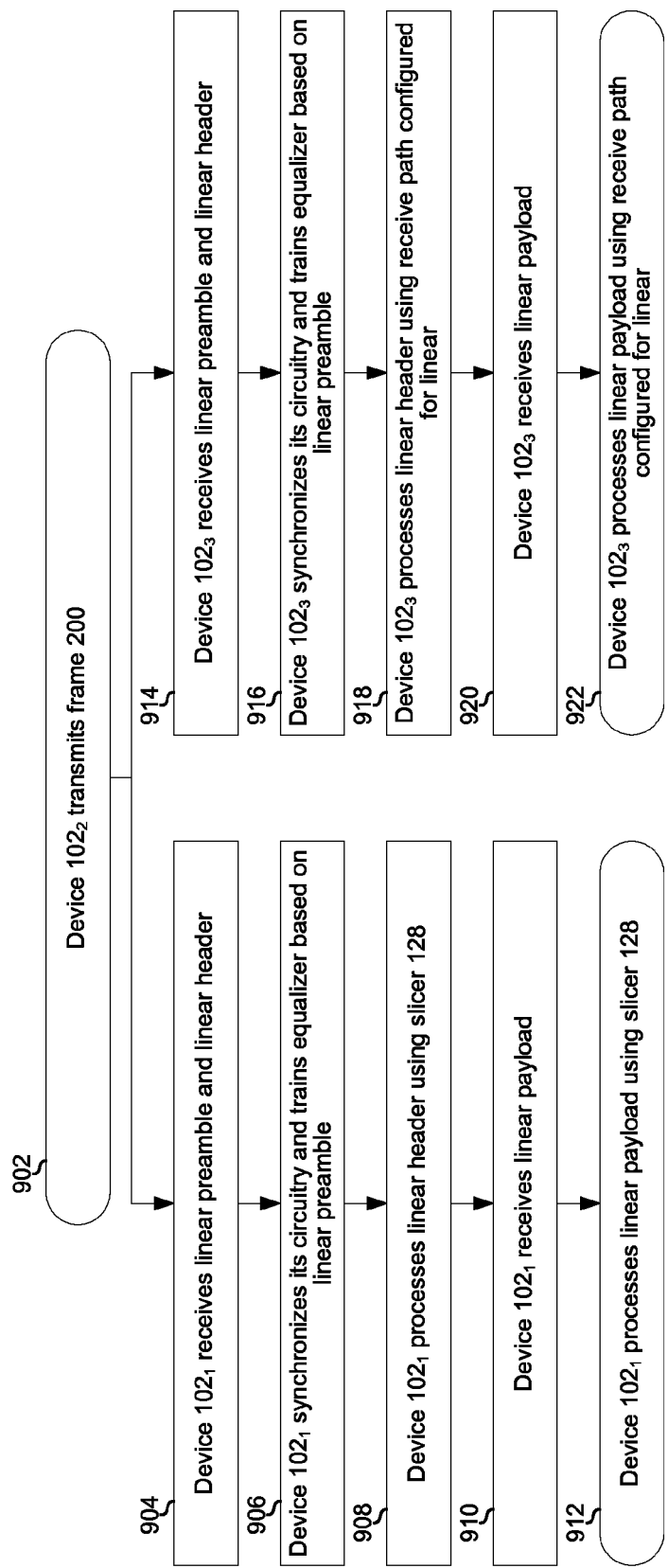
FIG. 9 depicts a flowchart for an example communication using the frame format of FIG. 7.

FIG. 9 depicts a flowchart for an example communication using the frame format of FIG. 7. The process begins with block 902. In block 902, the device 102₂ transmits frame 700. The frame 700 may be transmitted with the nonlinear distorter 155 disabled and/or configured for linear operation (e.g., a power amplifier biased in its linear region).

In block 904, the device 102₁ receives the linear preamble and linear header of frame 200 via filter 130. In block 906, the device 102₁ synchronizes its circuitry and trains its equalizer (as necessary), using the linear preamble of frame 200. In block 908, the device 102₁ processes the linear header using the slicer 128. In block 910, the device 102₁ receives the linear payload via filter 130. In block 912, the device 102₁ processes linear payload using slicer 128.

In block 914, the device 102₃ receives the linear preamble and the linear header via filter 162. In block 916, the device 102₃ synchronizes its circuitry and trains its equalizer using the linear preamble. In block 918, the device 102₃ processes the linear header using a receive path configured for linear signals. Such a mode may, for example, be characterized the nonlinear distortion compensation circuit 168 being disabled or bypassed.

In block 920, the device 102$_3$ receives the linear payload via filter 162. In block 922, the device 102$_3$ processes the linear payload using a receive path configured for linear signals. Such a mode may, for example, be characterized by the nonlinear distortion compensation circuit 168 being disabled or bypassed.

Figure 10:
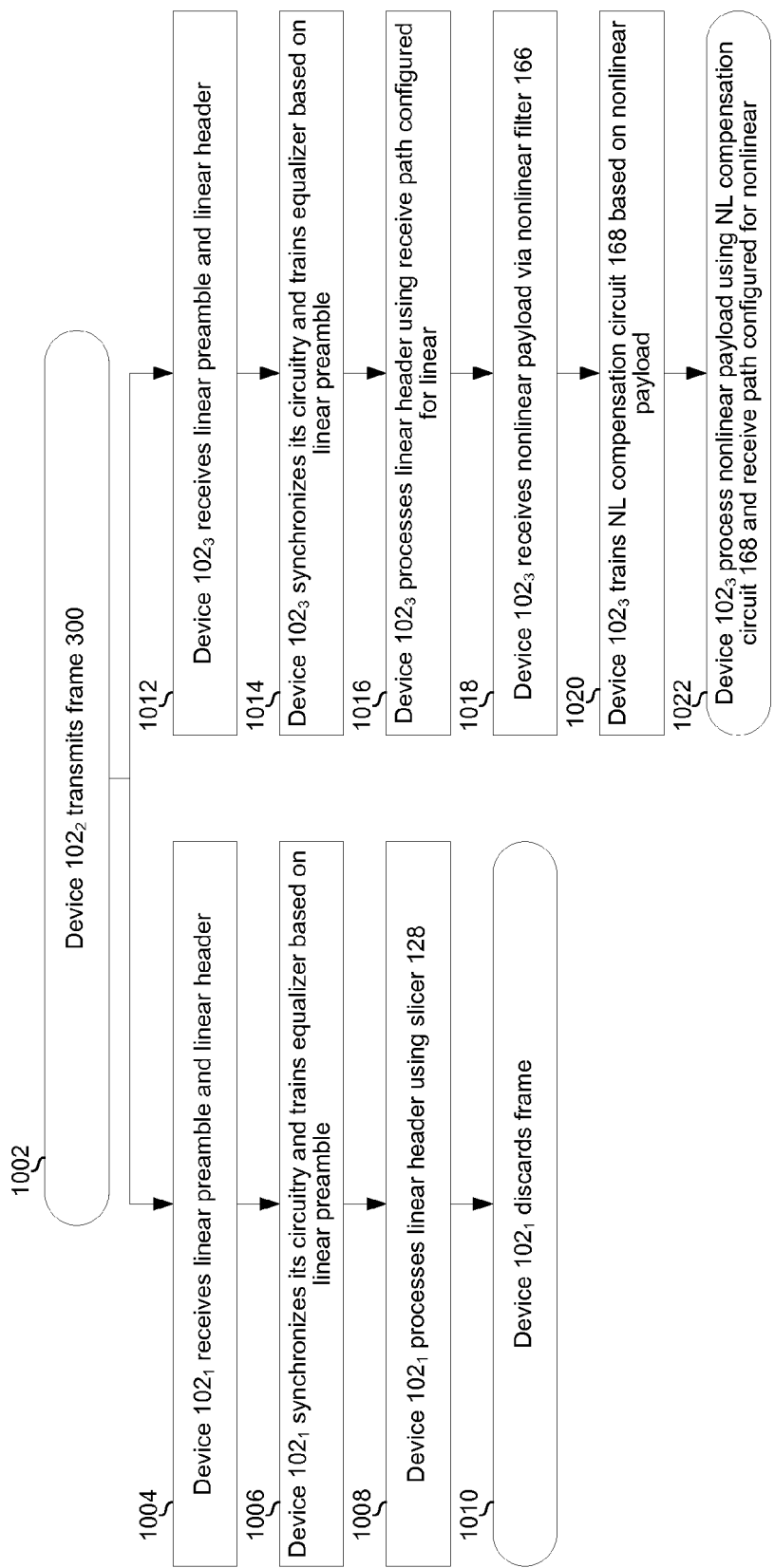
FIG. 10 depicts a flowchart for an example communication using the frame format of FIG. 8A.

FIG. 10 depicts a flowchart for an example communication using the frame format of FIG. 8A. The process begins with block 1002. In block 1002, the device 102$_2$ transmits frame 300. In an example implementation, the linear preamble and the linear header are transmitted using nonlinear distorter 155 configured to generate a linear signal (e.g., predistortion reduced, bypassed, or disabled, and power amplifier biased in linear region), while the nonlinear payload is transmitted using nonlinear distorter 155 configured to generate a nonlinear signal (e.g., predistortion enabled or increased, and/or power amplifier biased in nonlinear region).

In block 1004, the device 102$_1$ receives the linear preamble and linear header via filter 130. In block 1006, device 102$_1$ synchronizes its circuitry and trains its equalizer (as necessary) using the linear preamble. In block 1008, the device 102$_1$ processes the linear header using slicer 128. In block 1010, device 102$_1$ either fails to detect the payload, or discards the payload after detecting, based on the header, that the payload will be a nonlinear signal, which the device 102$_1$ is not configured to support. Where the device 102$_1$ fails to detect the payload it may nonetheless retain synchronization with the device 102$_2$ based on the frame length field detected in the linear header.

In block 1012, device 102$_3$ receives the linear preamble and the linear header via filter 162. In block 1014, device 102$_3$ synchronizes its circuitry and trains its equalizer (as necessary). In block 1016, the device 102$_3$ processes the linear header using a receive path configured for linear signals. Such a receive path may, for example, bypass the NL compensation circuit 168, or the NL compensation circuit 168 may be in the receive path but be powered down and/or have its parameters set such that the response of its model of nonlinearity reduces to a linear response. In block 1018, the device 102$_3$ receives nonlinear payload via nonlinear filter 166. In block 1020, the NL compensation circuit 168 trains its model of the nonlinear distortion present in the payload based on the payload itself (e.g., predetermined portions of the payload and/or using iterative decision feedback). In block 1022, the device 102$_3$ process the nonlinear payload using a receive path configured for nonlinear signals. Such a receive path may comprise the NL compensation circuit 168 trained in block 1020.

Figure 11:
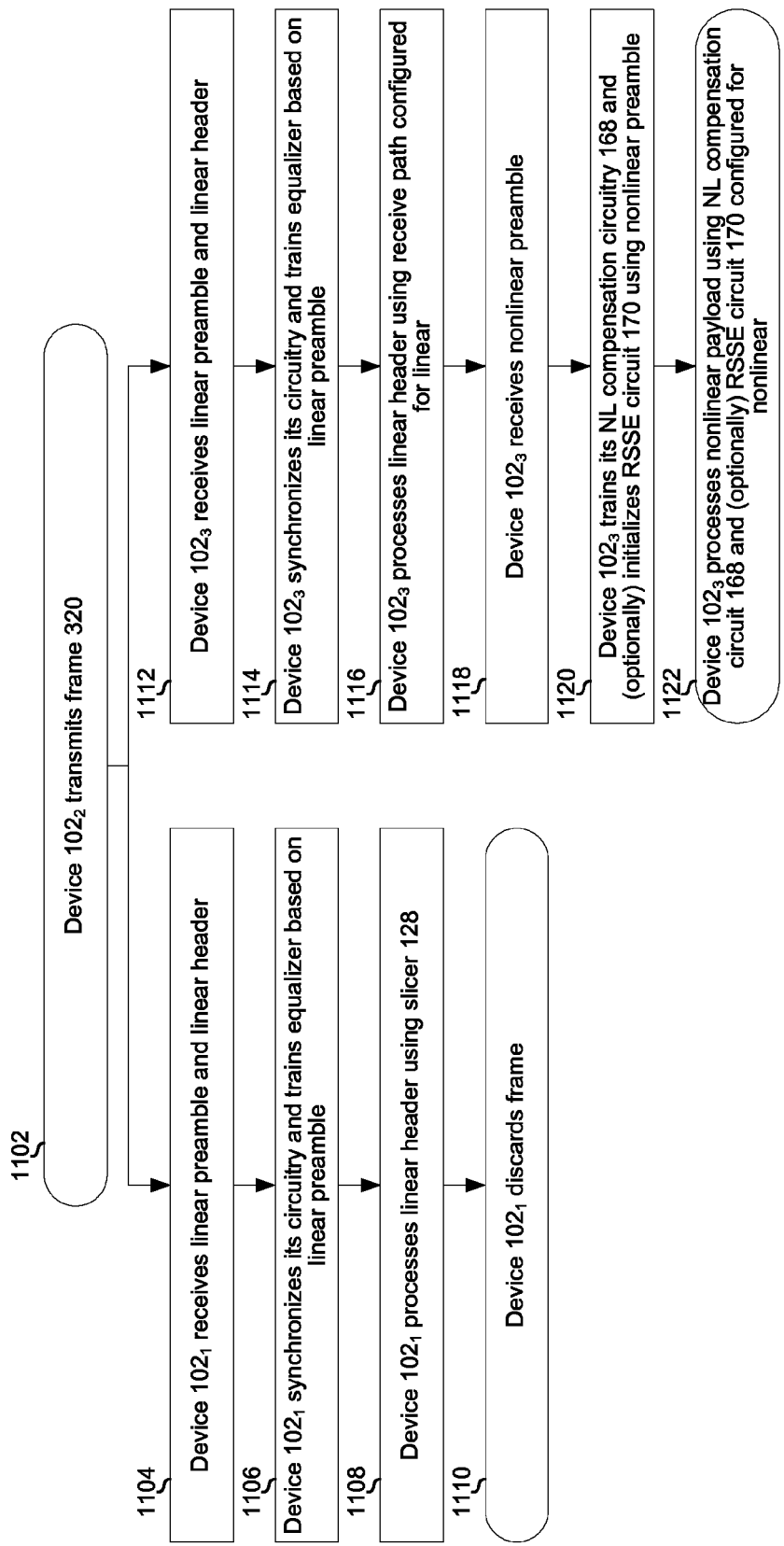
FIG. 11 depicts a flowchart for example communication using the frame format of FIG. 8B.

FIG. 11 depicts a flowchart for example communication using the frame format of FIG. 8B. The process begins with block 1102. In block 1102, the device 102$_2$ transmits frame 320. In an example implementation, the linear preamble and the linear header are transmitted using nonlinear distorter 155 configured to generate a linear signal (e.g., predistortion reduced, bypassed, or disabled, and/or power amplifier biased in linear region), while the nonlinear preamble and nonlinear payload are transmitted using nonlinear distorter 155 configured to generate a nonlinear signal (e.g., predistortion enabled or increased, and/or power amplifier biased in nonlinear region).

In block 1104, the device 102$_1$ receives the linear preamble and the linear header via filter 130. In block 1106, the device 102$_1$ synchronizes its circuitry and trains its equalizer (as necessary) based on the linear preamble. In block 1108, the device 102$_1$ processes the linear header using slicer 128. In block 1110, device 102$_1$ either fails to detect the payload or discards the payload after detecting, based on the header, that the payload will be transmitted as an nonlinear signal, which the device 102$_1$ is not configured to support. Where the device 102$_1$ fails to detect the payload it may nonetheless retain synchronization with the device 102$_2$ based on the frame length field detected in the linear header.

In block 1112, the device 102$_3$ receives the linear preamble and the linear header via filter 1112. In block 1114, the device 102$_3$ synchronizes its circuitry and trains its equalizer (as necessary) based on the linear preamble. In block 1116, the device 102$_3$ processes the linear header using a receive path configured for linear signals. Such a receive path may, for example, bypass the NL compensation circuit 168, or the NL compensation circuit 168 may be in the receive path but powered down and/or have its parameters set such that the response of its model of nonlinearity reduces to a linear response. In block 1118, the device 102$_3$ receives the nonlinear preamble via filter 166. In block 1120, the device 102$_3$ trains its nonlinear distortion compensation circuitry 168 such that a nonlinear distortion model maintained by the nonlinear distortion compensation circuitry 168 can predict/reproduce (with desired accuracy) the nonlinear distortion present in the nonlinear signals from device 102$_2$, and (optionally) initializes the state of the RSSE circuit 170 using the nonlinear preamble. In block 1122, the device 102$_3$ process the nonlinear payload using the trained nonlinear distortion compensation circuit 168 and (initialized) RSSE circuit 170.

In accordance with various aspects of this disclosure, a transmitter (e.g., 152) comprises a symbol mapper (e.g., 154) operable to map a frame of bits to a frame of symbols, where the symbols correspond to a determined modulation scheme, and circuitry (e.g., 155, 156, and/or 158) operable to convert the frame of symbols to a physical layer signal and transmit the physical layer signal onto a communication medium. The circuitry is operable to process the physical layer signal such that a first portion of the physical layer signal is a first type of signal (e.g., a linear signal and/or non-ISC signal) and a second portion of the physical layer signal is a second type of signal (e.g., nonlinear signal and/or ISC signal). The first portion of the physical layer signal may comprise a header, a preamble, and/or a payload of the frame. The second portion of the physical layer signal may comprise a header, a preamble, and/or a payload of the frame.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A transmitter comprising:
   a symbol mapping circuit configured to map a frame of bits to a frame of symbols, said symbols corresponding to a determined modulation scheme; and
   circuitry configured to convert said frame of symbols to a physical layer signal and transmit said physical layer signal onto a communication medium,
   wherein:
   said circuitry comprises a nonlinear distorter circuit configured to process said physical layer signal such that a first portion of said physical layer signal not including payload data is a linear signal and a second portion of said physical layer signal including payload data is a nonlinear signal.

2. The transmitter of claim 1, wherein said first portion of said physical layer signal comprises a header of said frame and said second portion of said physical layer signal comprises a payload of said frame.

3. The transmitter of claim 2, wherein:
   said nonlinear distorter circuit comprises a predistortion circuit;
   said predistortion circuit introduces more nonlinear distortion to said payload of said frame than to said header of said frame.

4. The transmitter of claim 2, wherein:
   said nonlinear distorter circuit comprises a power amplifier;
   said power amplifier operates in a linear response region during processing of said header of said frame; and
   said power amplifier operates in a nonlinear response region during processing of said payload of said frame.

5. The transmitter of claim 1, wherein said first portion of said physical layer signal comprises a header of said frame and said second portion of said physical layer signal comprises a preamble of said frame.

6. The transmitter of claim 5, wherein:
   said nonlinear distorter circuit comprises a predistortion circuit;
   said predistortion circuit introduces more nonlinear distortion to said preamble of said frame than to said header of said frame.

7. The transmitter of claim 5, wherein:
   said nonlinear distorter circuit comprises a power amplifier;
   said power amplifier operates in a linear response region during processing of said header of said frame; and
   said power amplifier operates in a nonlinear response region during processing of said preamble of said frame.

8. The transmitter of claim 1, wherein said first portion of said physical layer signal comprises a header of said frame, and said second portion of said physical layer signal comprises a preamble of said frame and a payload of said frame.

9. The transmitter of claim 8, wherein:
   said nonlinear distorter circuit comprises a predistortion circuit;
   said predistortion circuit introduces more nonlinear distortion to said preamble of said frame and said payload of said frame than to said header of said frame.

10. The transmitter of claim 8, wherein:
    said nonlinear distorter circuit comprises a power amplifier;
    said power amplifier operates in a linear response region during processing of said header of said frame; and
    said power amplifier operates in a nonlinear response region during processing of said payload of said frame and said preamble of said frame.

11. The transmitter of claim 1, wherein said first portion of said physical layer signal comprises a first preamble of said frame and a header of said frame, and said second portion of said physical layer signal comprises a second preamble of said frame and a payload of said frame.

12. The transmitter of claim 11, wherein:
    said nonlinear distorter circuit comprises a predistortion circuit;
    said predistortion circuit introduces more nonlinear distortion to said second preamble of said frame and said payload of said frame than to said header of said frame and said first preamble of said frame.

13. The transmitter of claim 11, wherein:
    said nonlinear distorter circuit comprises a power amplifier;
    said power amplifier operates in a linear response region during processing of said header of said frame and said first preamble of said frame; and
    said power amplifier operates in a nonlinear response region during processing of said payload of said frame and said second preamble of said frame.

14. The transmitter of claim 1, wherein said second portion of said physical layer signal is an inter-symbol correlated signal.

15. A transmitter comprising:
a symbol mapping circuit configured to map a frame of bits to a frame of symbols, said symbols corresponding to a determined modulation scheme; and
circuitry operable to convert said frame of symbols to a physical layer signal and transmit said physical layer signal onto a communication medium,
wherein:
said circuitry comprises an inter-symbol correlated (ISC) signal generator configured to process said physical layer signal such that a first portion of said physical layer signal not including payload data is a non-ISC signal and a second portion of said physical layer signal including payload data is an ISC signal.

16. The transmitter of claim 15, wherein said first portion of said physical layer signal comprises a header of said frame and said second portion of said physical layer signal comprises a payload of said frame.

17. The transmitter of claim 15, wherein said first portion of said physical layer signal comprises a header of said frame and said second portion of said physical layer signal comprises a preamble of said frame.

18. The transmitter of claim 15, wherein said first portion of said physical layer signal comprises a header of said frame, and said second portion of said physical layer signal comprises a preamble of said frame and a payload of said frame.

19. The transmitter of claim 15, wherein said first portion of said physical layer signal comprises a first preamble of said frame and a header of said frame, and said second portion of said physical layer signal comprises a second preamble of said frame and a payload of said frame.

20. The transmitter of claim 15, wherein said second portion of said physical layer signal is a nonlinear signal.

* * * * *